United States Patent Office 3,306,846
Patented Feb. 28, 1967

3,306,846
PEROXIDE REMOVAL USING LEAD DIOXIDE
OR MANGANESE DIOXIDE
Kailash C. Salooja, Wirral, England, assignor to Shell Oil
Company, New York, N.Y., a corporation of Delaware
No Drawing. Filed Dec. 29, 1964, Ser. No. 422,010
Claims priority, application Great Britain, Jan. 3, 1964,
337/64
4 Claims. (Cl. 208—295)

This invention relates to a process for removing organic peroxides from hydrocarbons. More particularly, the invention concerns treatment of gasoline-range hydrocarbons to increase their storage stability and resistance to deterioration caused by peroxide formation.

On standing in storage in the presence of dissolved oxygen or an oxidizing atmosphere, certain hydrocarbons, especially those containing unsaturates, tend to form peroxides which in turn promote gum formation and general instability. These peroxides probably promote polymerization of unsaturated hydrocarbons and may be polymerized themselves. The presence of these peroxides and resulting gum products is detrimental to the use and further handling of the hydrocarbon products since they cause clogging of screens and carburetor parts, valve sticking, discoloration, and gradual deterioration of the product.

It has now been discovered that these peroxides can be removed from peroxide-containing hydrocarbons by contacting the hydrocarbons at ambient conditions with lead dioxide, manganese dioxide or a mixture of lead and manganese dioxides. These materials are inexpensive solids and provide economical and efficient removal of peroxides, thereby imparting excellent storage stability to the hydrocarbons.

The process of the invention is applicable to a wide variety of hydrocarbon. In general, however, the hydrocarbon fraction must not contain acidic sulfur or sulfur products but should contain at least a small amount of unsaturated material, for example, at least about 0.1% unsaturates. The presence of olefins is not essential, however, since certain aromatics such as cumene and Tetralin are believed to also contribute to gum formation. Preferred feeds for the process of the invention are hydrocarbons in the gasoline range which are essentially free from sulfur compounds, such as hydrogen sulfide and mercaptan.

The treatment of the invention may be effected by any means so long as substantially all of the gasoline to be treated is contacted with the particular dioxide or mixture of dioxides being used. For example, a plurality of rods or plates which have been coated with a film of lead and/ or manganese dioxide may be suspended into gasoline storage tanks. Suitable rods or plates are made from a substance inert to attack by the contents of the storage tank and have a surface to which the required dioxide will adhere. Suitable rods and plates have been fabricated from, e.g., thermoplastic cast acrylic sheeting, which is resistant to aliphatic hydrocarbons, by softening the surface with chloroform or carbon tetrachloride and subsequently dusting the finely powdered dioxide on the softened surface. Alternatively, treatment may be effected by passing the hydrocarbons to be treated through a fixed bed of catalyst or by suspending in the storage tanks bags which are inert to but permeable to gasoline and which contain catalyst, e.g. nylon mesh containing the manganese or lead dioxide in a granulated or coarsely powdered form. Replenishment of the dioxide or dioxides is easily achieved by simply replacing the used rods, plates or bags with new ones. A fixed-bed type of operation may be conveniently carried out by situating a bed of catalyst in a refinery pipe line, thereby treating gasoline for peroxide removal, for example, as gasoline is being pumped from one tank to another.

The process of the invention is not limited to bulk quantities of gasoline such as are found in refineries, but can be also applied to garage gasoline storage tanks and even to gasoline tanks of automobiles. The invention is also useful for increasing the storage stability of pure hydrocarbons which may be treated in small quantities, for example, laboratory samples.

The treatment of the invention is generally carried out at ambient conditions with hydrocarbon in the liquid phase. The amounts of lead and/or manganese dioxide used in the treatment are not critical but generally range between about 0.01 and 1 gram of catalyst per imperial gallon of gasoline to be treated. Similarly the length of time of the treatment is not critical and may vary from only a few seconds, as in the case where gasoline is passed through a fixed bed of catalyst, to several days and even weeks, as in the case where treatment is carried out directly in the storage tank. The process is operable over a wide variety of temperatures and pressures; ambient conditions are generally satisfactory. The catalyst may be either pure lead dioxide or pure manganese dioxide or a mixture of the two in any proportions. Inert materials or promoters may also be present; the essential factor is the presence of at least one of the two dioxides.

To illustrate the effectiveness of the process of the invention, certain hydrocarbons known to be susceptible to peroxide formation during storage were treated with lead and/or manganese dioxide. For comparison, these hydrocarbons were also treated with known treating agents. The amount of solid treating agents used in the tests was 0.5 gram per imperial gallon of hydrocarbon. The tests were conducted for 60 hours at ambient temperatures. The results of the tests are found in Table I.

TABLE I

| Treating Agent Used | Peroxide Content of Hydrocarbon Tested, Percent vol. | | | | | | | | |
|---|---|---|---|---|---|---|---|---|---|
| | Hexene-1 | Hexene-2 | 4-Methyl pentene-2 | Cyclohexene | | 1,4-Hexadiene | 1,4-Cyclo-hexadiene | Cumene | |
| None | 0.085 | 6.63 | 5.40 | 2.32 | 0.59 | 0.053 | 0.22 | 0.041 | 0.049 |
| Topanol A[1] (0.1%) | | 6.25 | | 1.64 | | 0.047 | | 0.040 | |
| Iron powder | 0.090 | | 1.90 | | 0.67 | | | 0.038 | |
| Lead monoxide | 0.024 | | 3.10 | | 0.84 | 0.043 | | 0.037 | 0.046 |
| Lead dioxide | 0.016 | | 0.70 | 0.10 | 0.20 | 0.018 | 0.20 | 0.024 | 0.043 |
| Manganese dioxide | 0.003 | 1.86 | 1.40 | | 0.26 | 0.027 | 0.06 | 0.018 | 0.031 |
| Lead dioxide plus manganese dioxide | 0.005 | | 0.95 | | 0.24 | 0.030 | 0.14 | | 0.033 |

[1] 2,4-dimethyl-6-tertiary butyl phenol.

From these results it is apparent that catalysts of the invention are effective for peroxide removal, whereas other known antioxidants and related materials are relatively ineffective.

Two gasolines were stored under oxidative conditions for one year and were then tested for peroxide content immediately prior to and after treatment by the process of the invention. The first gasoline, designated as Gasoline I, was 100% catalytically cracked top gasoline. The second gasoline, designated as Gasoline II, was 100% full range Platformate gasoline. Each gasoline contained 150 p.p.m. of a commercial antioxidant, 2,4-dimethyl-6-tertiary butyl phenol. Catalytically cracked and Platformate gasolines were specifically chosen since they were considered to be the most important constituents of present commercial gasolines. The results of the test are shown in Table II.

TABLE II

| Treating Agent Used (0.5 gram per Imperial gallon of hydrocarbon) | Peroxide Content of Hydrocarbon Tested, percent vol. | |
| --- | --- | --- |
| | Gasoline I | Gasoline II |
| None | 0.0067 | 0.0266 |
| Lead dioxide | 0.0031 | 0.0107 |
| Manganese dioxide | 0.0021 | 0.0099 |
| Lead/manganese dioxides (1:1 weight ratio) | 0.0030 | 0.0108 |

In addition, the gasolines described above were also tested for antiknock rating, using a Cooperative Fuel Research engine before and after treatment according to the invention. It can be seen from the results in Table III that the process of the invention, in addition to increasing the storage stability of gasoline provides a small but significant increase in antiknock rating of the gasoline.

TABLE III

| Treating Agent Used | Knock Rating | |
| --- | --- | --- |
| | Gasoline I | Gasoline II |
| None | 93.6 | 93.2 |
| Lead dioxide | 94.0 | 93.8 |
| Manganese dioxide | 94.0 | 93.9 |
| Lead/manganese dioxides | 94.0 | 93.9 |

I claim as my invention:

1. A method of removing peroxides from a refined hydrocarbon substantially free from acidic sulfur-containing constituents which comprises contacting the hydrocarbon with a treating agent selected from the group consisting of lead dioxide, manganese dioxide, and mixtures thereof.

2. A method of removing peroxides from a refined gasoline substantially free from hydrogen sulfide and mercaptans which comprises contacting the gasoline at ambient conditions with a treating agent selected from the group consisting of lead dioxide, manganese dioxide, and mixtures thereof.

3. The method of claim 2 wherein the treating agent is lead dioxide.

4. The method of claim 2 wherein the treating agent is manganese dioxide.

References Cited by the Examiner
UNITED STATES PATENTS

| | | | |
| --- | --- | --- | --- |
| 2,057,629 | 10/1936 | Morrell et al. | 208—295 X |
| 2,076,524 | 4/1937 | Behrens | 44—50 |
| 2,115,781 | 5/1938 | Morrell | 208—257 |
| 2,398,612 | 4/1946 | Bergsteinsson et al. | 260—597 |
| 2,809,921 | 10/1957 | Vesely et al. | 208—257 X |
| 2,970,104 | 1/1961 | Snyder et al. | 208—295 |

DELBERT E. GANTZ, *Primary Examiner.*

R. H. SHUBERT, *Assistant Examiner.*